United States Patent
Lee et al.

(10) Patent No.: US 9,222,511 B2
(45) Date of Patent: Dec. 29, 2015

(54) SLIDING BEARING AND SLIDING BEARING ASSEMBLY

(75) Inventors: Chung Rae Lee, Gyeonggi-do (KR); Ki Hwan Hong, Incheon (KR); Sang Beom Kim, Seoul (KR); Keun Chul Song, Seoul (KR)

(73) Assignee: DOOSAN INFRACORE CO., LTD., Incheon (KR)

( * ) Notice: Subject to any disclaimer, the term of this patent is extended or adjusted under 35 U.S.C. 154(b) by 0 days.

(21) Appl. No.: 13/132,953

(22) PCT Filed: Dec. 1, 2009

(86) PCT No.: PCT/KR2009/007103
§ 371 (c)(1), (2), (4) Date: Jun. 6, 2011

(87) PCT Pub. No.: WO2010/064824
PCT Pub. Date: Jun. 10, 2010

(65) Prior Publication Data
US 2011/0235955 A1    Sep. 29, 2011

(30) Foreign Application Priority Data
Dec. 5, 2008 (KR) .................... 10-2008-0122960

(51) Int. Cl.
*F16C 33/10* (2006.01)
*F16C 17/02* (2006.01)

(52) U.S. Cl.
CPC ........... *F16C 33/103* (2013.01); *F16C 33/1065* (2013.01); *F16C 17/02* (2013.01)

(58) Field of Classification Search
CPC ............ F16C 3/08; F16C 3/14; F16C 11/068; F16C 33/106; F16C 33/1065; F16C 33/1085; F16C 33/103; F16C 33/10; F16C 33/101; F16C 33/1025; F16C 2350/00; F16C 2350/26; F16C 2350/52; F16C 2350/54; F16C 2310/00; F16C 17/02
USPC .................... 384/93, 282–294, 322, 302, 385
See application file for complete search history.

(56) References Cited

U.S. PATENT DOCUMENTS

| | | | |
|---|---|---|---|
| 2,673,767 A * | 3/1954 | Schoeppner | 384/291 |
| 3,300,259 A * | 1/1967 | Howard | 384/291 |
| 3,343,893 A * | 9/1967 | Hall | 384/291 |
| 4,342,491 A * | 8/1982 | Jamison et al. | 384/286 |
| 4,538,929 A | 9/1985 | Ehrentraut et al. | |

(Continued)

FOREIGN PATENT DOCUMENTS

| | | |
|---|---|---|
| CN | 1106900 A | 8/1995 |
| CN | 2833219 Y | 11/2006 |

(Continued)

OTHER PUBLICATIONS

DE 3326316 A1—Machine Translation.*
International Search Report: mailed Jun. 29, 2010; Appln. PCT/KR2009/007103.

*Primary Examiner* — Alan B Waits
(74) *Attorney, Agent, or Firm* — Ladas & Parry LLP (57) ABSTRACT

The present invention relates to a sliding bearing including a lubricating oil storing unit storing lubricating oil on the surface thereof and the sliding bearing of the present invention is provided so that the volume of the lubricating oil storing unit occupies 5 to 30 volume % of the entire volume of the sliding bearing.

5 Claims, 7 Drawing Sheets

Section 'VII–VII'

(56) References Cited

U.S. PATENT DOCUMENTS

| | | | |
|---|---|---|---|
| 5,490,730 A * | 2/1996 | Akita et al. | 384/147 |
| 6,095,690 A * | 8/2000 | Niegel et al. | 384/293 |
| 6,241,393 B1 * | 6/2001 | Georges et al. | 384/130 |
| 6,634,791 B2 * | 10/2003 | Ono et al. | 384/291 |
| 6,709,160 B1 * | 3/2004 | Ward et al. | 384/286 |
| 6,896,411 B2 * | 5/2005 | Lee | 384/285 |
| 6,991,377 B2 * | 1/2006 | Yamamoto et al. | 384/291 |
| 7,785,013 B2 * | 8/2010 | Egami et al. | 384/283 |
| 2004/0042698 A1 * | 3/2004 | Yamamoto et al. | 384/291 |
| 2005/0175263 A1 * | 8/2005 | Nanbu et al. | 384/12 |
| 2005/0286822 A1 * | 12/2005 | Maruyama et al. | 384/283 |
| 2008/0152271 A1 * | 6/2008 | Barlerin et al. | 384/322 |

FOREIGN PATENT DOCUMENTS

| | | | |
|---|---|---|---|
| DE | 3326316 A1 * | | 2/1985 |
| JP | 58077917 A * | | 5/1983 |
| JP | 11-269508 A | | 10/1999 |
| JP | 08-291823 A | | 11/1999 |
| JP | 2000-504089 A | | 4/2000 |
| JP | 2005-098410 A | | 4/2005 |
| KR | 1999-0082076 A | | 11/1999 |
| KR | 1019990082076 A | | 11/1999 |
| KR | 1020060070264 A | | 6/2006 |
| KR | 1020080082832 A | | 9/2008 |
| WO | 97/28379 A2 | | 8/1997 |

* cited by examiner

Section 'III-III'

Figure 3

Blown up view of section 'III-III' of Fig 3

Figure 4

Blown up view of section 'III–III' of Fig 3

Figure 5

Section 'VI–VI'

Figure 6

Section 'VII-VII'

Figure 7

Blown up view of 112 in $S_2$ of section 'VIII-VIII' of Fig 2

Figure 8

Blown up view of 112 in S₂ of section 'IX—IX' of Fig 2

Figure 9

Blown up view of 112 in S₂ of section 'X—X' of Fig 2

Figure 10

Section 'IX–IX' with boss 400 alcund section 'IX–IX'

Figure 11

Figure 12

SLIDING BEARING AND SLIDING BEARING ASSEMBLY

TECHNICAL FIELD

The present invention relates to a sliding bearing used for a connection part of a mechanical device and a sliding bearing assembly including the same.

BACKGROUND ART

A bearing is a mechanical component that serves to fix a shaft of a machine that rotates to a predetermined position and rotate the shaft while supporting a weight of the shaft and a load applied to the shaft. This bearing is generally divided into a rolling bearing and a sliding bearing according to a contact state with the shaft. Since the sliding bearing therebetween is excellent in a capability to support the load applied to the shaft, it is generally used for various connection parts of a construction machine, and the like.

When the shaft is inserted into the sliding bearing to rotate and shake, lubricating oil is supplied to the shaft or sliding bearing in order to prevent the shaft or sliding bearing from being worn due to interfriction.

However, when the sliding bearing to which the lubricating oil is supplied stops and operates, or when the fluctuating load is received from the outside, an oil film formed on the sliding bearing may be partially broken and since an oil film shortage phenomenon occurs due to exhaustion of the lubricating oil after the sliding bearing operates for a predetermined time, the lubricating oil should be supplied periodically to the sliding bearing.

If the sliding bearing operates with the oil film short, an abrasion rate is increased by friction between the shaft and the sliding bearing and seizure (a friction surface between the shaft and the bearing is heated by heat caused by the friction to melt a part of metal, such that the friction surface becomes rough or is fused on an opposite surface) occurs between the shaft and the sliding bearing by friction heat.

Accordingly, an operation of supplying the lubricating oil to the sliding bearing periodically is very important, but since the lubricating oil supplying operation is inconvenient and the mechanical device cannot be operated while performing the supplying operation, an operational rate of the device is also deteriorated.

As a result, a technology that extends a supplying cycle to supply the lubricating oil to the sliding bearing and prevents the seizure from being generated is being attempted variously as a method for solving the problem. Examples thereof may include Korean Unexamined Application Publication No. 10-2006-0070264 in which the lubricating oil is stored in the shaft and the lubricating oil is supplied directly to the shaft when the lubricating oil stored in the shaft is exhausted and Korean Unexamined Application Publication No. 10-1999-0082076 in which a groove is formed in the bearing and the lubricating oil is stored in the groove.

Figure 1:
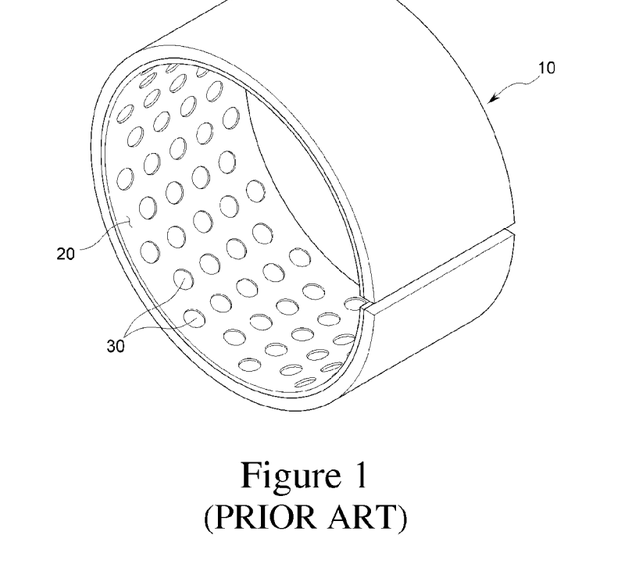
FIG. 1 is a perspective view for describing a known sliding bearing.

Herein, Korean Unexamined Application Publication No. 10-1999-0082076 (hereinafter, referred to as the 'related art') will be described below with reference to FIG. 1.

In the related art, a lubricant pocket 30 having a depth in the range of 0.03 to 0.3 mm and an area ratio to the depth of 10 to 40 mm is formed on a surface 20 to which a bearing 10 slides and serves to supply the lubricating oil to the surface 20 to which the bearing 10 slides, thereby preventing a partial oil film cut-off phenomenon to the bearing 10.

However, in the bearing 10 disclosed in the related art, a circular pocket 30 is formed to disperse a contact surface, the lubricating oil is stored in the formed pocket 30 to constantly maintain the oil film on the surface 20 to which the bearing 10 slides, but since the shape of the pocket 30 is too small, the pocket 30 cannot sufficiently store the lubricating oil, and as a result, there was a limit in extending the lubricating oil supplying cycle.

Meanwhile, in order to increase the amount of the lubricating oil that circulates between the shaft and the sliding bearing, there may be used a method for storing a large amount of lubricating oil by increasing the size of the groove for storing the lubricating oil in the sliding bearing and increasing the number of the grooves. However, when the size of the groove for storing the lubricating oil is increased or the number thereof is increased, an actual contact area between the shaft and the sliding bearing is decreased and a contact pressure between the shaft and the sliding bearing is increased, and as a result, an adverse effect in that the abrasion rate of the sliding bearing is increased and the seizure is generated by the friction heat is taken.

Accordingly, in order to increase the amount of the lubricating oil stored in the sliding bearing and disperse the contact pressure acting between the shaft and the sliding bearing, diameters of the shaft and the sliding bearings should be increased and lengths of the shaft and the sliding bearing in a shaft direction should be extended. However, when the diameter and length of each of the shaft and the sliding bearing are increased, there is a problem in that a sliding bearing assembly including the shaft and the sliding bearing become bigger on the whole.

DISCLOSURE

Technical Problem

In order to solve the problems, an object of the present invention is to provide a sliding bearing and a sliding bearing assembly including the same that can improve lubricity, seizure-resistance, abrasion-resistance of the sliding bearing and extend a lubricating oil supplying time by maximally providing a space capable of storing lubricating oil in the sliding bearing without enlarging the sliding bearing.

Technical Solution

In order to achieve the above object, the present invention provides a sliding bearing including a lubricating oil storing unit storing lubricating oil on the surface thereof, wherein the volume of the lubricating oil storing unit occupies 5 to 30 volume % of the entire volume of the sliding bearing.

According to an exemplary embodiment of the present invention, the volume of the lubricating oil storing unit may occupy 6.7 to 13.6 volume % of the entire volume of the sliding bearing.

According to another exemplary embodiment of the present invention, the volume of the lubricating oil storing unit may occupy 8.3 to 11.6 volume % of the entire volume of the sliding bearing.

At this time, the volume $V_1$ of the lubricating oil storing unit represents the volume of the lubricating oil storing unit in the entire volume ($V_1+V_2$ (a volume other than the volume of the lubricating oil storing unit in the entire volume of the sliding bearing)) of the sliding bearing.

Meanwhile, the sliding bearing of the present invention may include an inner peripheral surface and an outer peripheral surface, and the lubricating oil storing unit may include a first lubricating oil storage provided on the inner peripheral surface of the sliding bearing and a second lubricating oil storage provided on the outer peripheral surface of the sliding bearing.

Herein, according to an exemplary embodiment of the present invention, the surface area of the first lubricating oil storage on the inner peripheral surface of the sliding bearing may be 15 to 60% of the entire area of the inner peripheral surface of the sliding bearing.

Further, according to another exemplary embodiment of the present invention, the surface area of the first lubricating oil storage on the inner peripheral surface of the sliding bearing may be 20.8 to 48.1% of the entire area of the inner peripheral surface of the sliding bearing.

At this time, the surface area $S_a$ of the first lubricating oil storage represents the surface area of the first lubricating oil storage in the entire area ($S_a+S_b$ (an area other than the surface area of the first lubricating oil storage in the entire area of the inner peripheral surface of the sliding bearing)) of the inner peripheral surface of the sliding bearing.

The sliding bearing of the present invention may further include a plurality of passages connecting the first lubricating oil storage and the second lubricating oil storage.

Further, an inclination angle between the first lubricating oil storage and the inner peripheral surface of the sliding bearing in the inner peripheral surface of the sliding bearing of the present invention may be in the range of 120 to 160 degrees.

Meanwhile, according to an exemplary embodiment of the present invention, the first lubricating oil storage may include one or more ring grooves formed in the circumferential direction of the sliding bearing and three or more pocket grooves formed around the ring grooves. Herein, the ring groove represents a groove formed in a ring shape by rotating the inner peripheral surface of the sliding bearing at one time in the circumferential direction of the sliding bearing and the pocket groove represents a groove formed in a dent puddle shape around the ring groove.

According to another exemplary embodiment of the present invention, a ratio of the length of the pocket groove in a longitudinal direction of the sliding bearing to the length of the pocket groove in a circumferential direction of the sliding bearing may be 1 or more.

Further, the length of the pocket groove in the longitudinal direction of the sliding bearing may be ⅟20 to ½ of the entire length of the sliding bearing.

In addition, the length of the pocket groove in the circumferential direction of the sliding bearing may be ⅟100 to ⅟20 of a circumferential length of the inner peripheral surface of the sliding bearing.

At this time, the circumferential direction of the sliding bearing represents a direction (direction A of FIG. 2) rotating on the inner peripheral surface or the outer peripheral surface of the sliding bearing and the longitudinal direction of the sliding bearing represents a direction (direction B of FIG. 2) along the length of the sliding bearing.

According to an exemplary embodiment of the present invention, the depth of the pocket groove may be in the range of 0.5 to 3 mm.

Meanwhile, the present invention provides another sliding bearing including a lubricating oil storing unit storing lubricating oil on the surface thereof, wherein the sliding bearing includes an inner peripheral surface and an outer peripheral surface, the lubricating oil storing unit includes a first lubricating oil storage provided on the inner peripheral surface of the sliding bearing and a second lubricating oil storage provided on the outer peripheral surface of the sliding bearing, the surface area of the first lubricating oil storage on the inner peripheral surface of the sliding bearing is 15 to 60% of the entire area of the inner peripheral surface of the sliding bearing, and the surface area of the second lubricating oil storage on the outer peripheral surface of the sliding bearing is 15 to 40% of the entire area of the outer peripheral surface of the sliding bearing.

At this time, the surface area $S_c$ of the first lubricating oil storage represents the surface area of the first lubricating oil storage in the entire area ($S_c+S_d$ (an area other than the surface area of the first lubricating oil storage in the entire area of the inner peripheral surface of the sliding bearing)) of the inner peripheral surface of the sliding bearing and the surface area $S_e$ of the second lubricating oil storage represents the surface area of the second lubricating oil storage in the entire area ($S_e+S_f$ (an area other than the surface area of the second lubricating oil storage in the entire area of the outer peripheral surface of the sliding bearing)) of the outer peripheral surface of the sliding bearing.

Further, the present invention provides a sliding bearing assembly including: a shaft; the sliding bearing that rotates or shakes by receiving the shaft; and a boss receiving the sliding bearing.

Herein, the sliding bearing assembly according to an exemplary embodiment of the present invention may further include dust seals provided at both sides of the sliding bearing, and the dust seals are provided to be separated from both ends of the sliding bearing by intervals in the range of 0 to 15 mm.

MODE FOR INVENTION

Hereinafter, the present invention will be described in detail.

[Sliding Bearing of First Structure]

Figure 2:
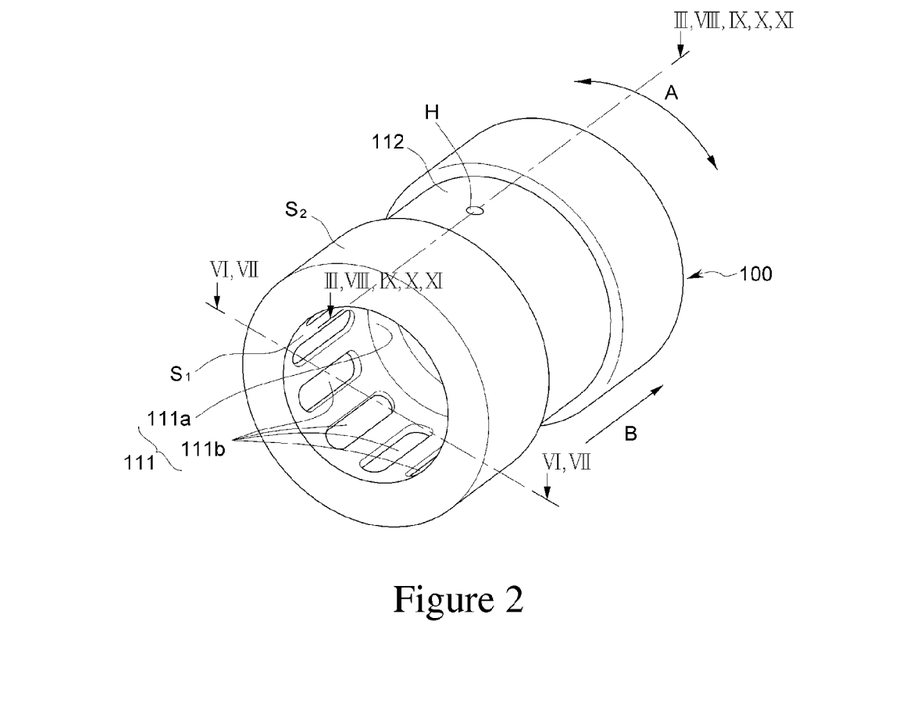
FIG. 2 is a perspective view of a sliding bearing according to a first structure of the present invention.
Figure 3:
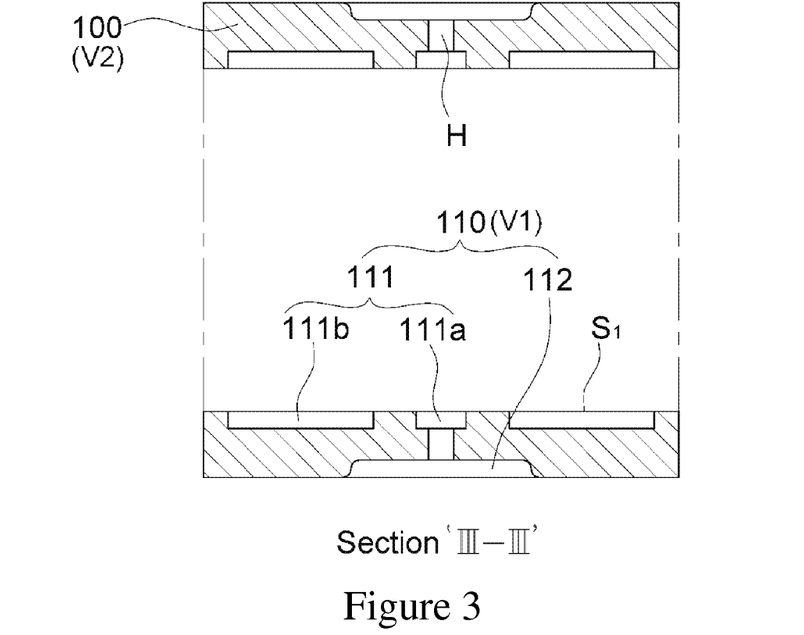
FIG. 3 is a cross-sectional view of a sliding bearing according to a first structure of the present invention.

FIG. 2 is a perspective view of a sliding bearing according to a first structure of the present invention and FIG. 3 is a cross-sectional view thereof.

Referring to FIGS. 2 and 3, the sliding bearing 100 according to the present invention includes a lubricating oil storing unit 110 storing lubricating oil on the surface thereof. The lubricating oil storing unit 110 is formed to obtain sufficient lubrication for a long time without causing partial oil film cut-off or oil film shortage between the sliding bearing 100 and a member (e.g., a shaft) that interacts (e.g., rotates and shakes) with the sliding bearing 100. The volume of the formed lubricating oil storing unit 110 occupies 5 to 30 volume % of the entire volume of the sliding bearing 100.

When the volume of the lubricating oil storing unit 110 is less than 5 volume % of the entire volume of the sliding bearing 100, a space containing the lubricating oil is too small, such that seizure may occur at a load lower than a load required to the sliding bearing 100. When the volume of the lubricating oil storing unit 110 is more than 30 volume % of the entire volume of the sliding bearing 100, the space containing the lubricating oil is too larger, such that overall rigidity of the sliding bearing 100 is insufficient, and as a result, the sliding bearing 100 may be deformed.

Herein, the volume of the lubricating oil storing unit 110 may be formed to occupy 6.7 to 13.6 volume % or 8.3 to 11.6 volume % of the entire volume of the sliding bearing 100.

Meanwhile, the sliding bearing 100 of the present invention includes an inner peripheral surface $S_1$ and an outer peripheral surface $S_2$ and the lubricating oil storing unit 110 may include a first lubricating oil storage 111 provided on the inner peripheral surface $S_1$ of the sliding bearing 100 and a second lubricating oil storage 112 provided on the outer peripheral surface $S_2$ of the sliding bearing 100.

At this time, the inner peripheral surface $S_1$ of the sliding bearing 100 corresponds to the surface of a hollow formed inside the sliding bearing 100, and particularly, when a member (e.g., a shaft) that interacts with the sliding bearing 100 is mounted inside the sliding bearing 100, the inner peripheral surface $S_1$ may be defined as a contact surface contacting the member that interacts with the sliding bearing 100. Further, the outer peripheral surface $S_2$ of the sliding bearing 100 may be defined as a contact surface contacting a member (e.g., a boss) receiving the sliding bearing 100.

The first lubricating oil storage 111 serves to reduce partial oil film cut-off by sufficiently supplying and circulating the lubricating oil to the inner peripheral surface $S_1$ of the sliding bearing 100 when the sliding bearing 100 operates and the surface area of the first lubricating oil storage 111 on the inner peripheral surface $S_1$ of the sliding bearing 100 may be 15 to 60% and preferably 20.8 to 48.1% of the entire area of the inner peripheral surface $S_1$ of the sliding bearing 100.

When the surface area of the first lubricating oil storage 111 is less than 15% of the entire area of the inner peripheral surface $S_1$ of the sliding bearing 100, the surface area to which the lubricating oil is supplied becomes too small and the lubricating oil cannot thus be circulated evenly on the inner peripheral surface $S_1$, and as a result, partial oil film cut-off occurs and friction heat increases rapidly, and when the surface area of the first lubricating oil storage 111 is more than 60%, the surface area to which the lubricating oil is supplied becomes too large and load resistance cannot thus be significantly acquired, and as a result, an oil film cut-off phenomenon may occur due to a high load.

Figure 4:
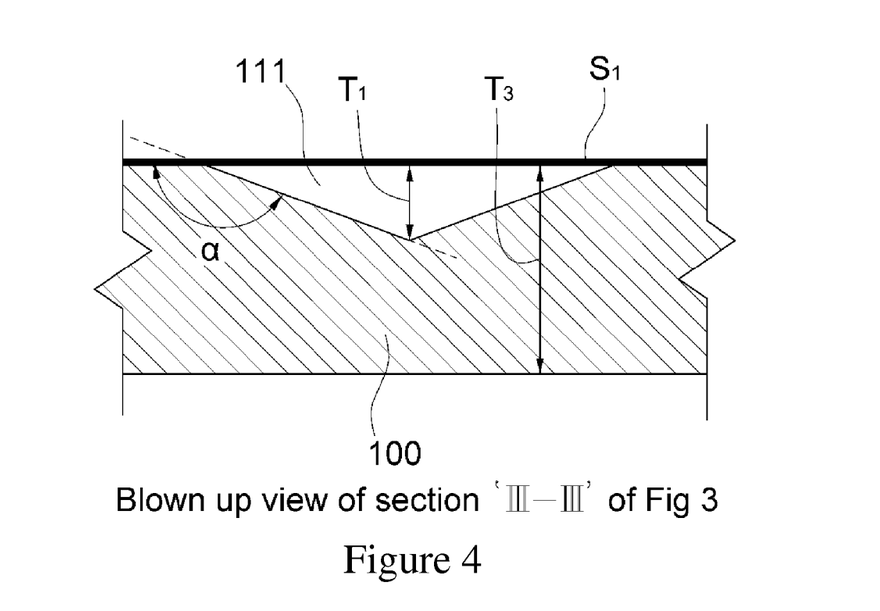
FIGS. 4 and 5 are cross-sectional views for describing a sliding bearing according to a first structure of the present invention.
Figure 5:
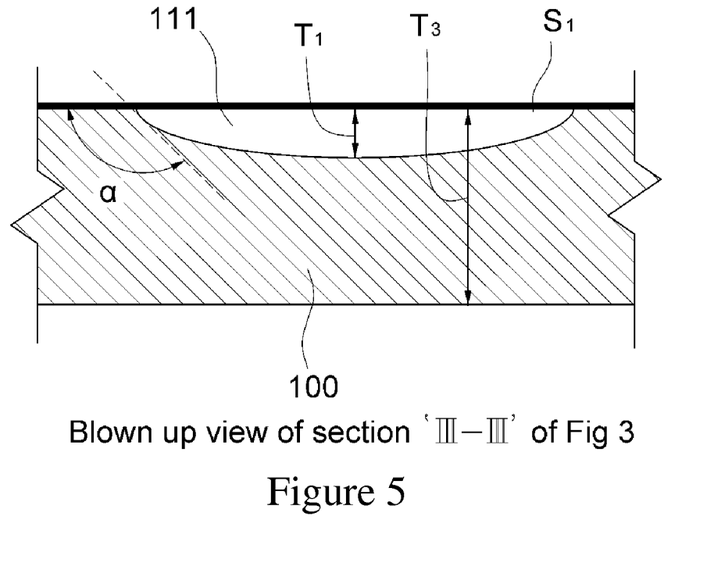

As shown in FIGS. 4 and 5 (FIGS. 4 and 5 show a cross-sectional shape of the first lubricating oil storage 111 which may be formed on the inner peripheral surface $S_1$ of the sliding bearing 100), the first lubricating oil storage 111 may be formed to have various cross-sectional shapes. At this time, the depth $T_1$ of the first lubricating oil storage 111 may be provided to be ⅔ or less of the thickness $T_3$ of the sliding bearing 100 when considering rigidity, and processing cost and time of the sliding bearing 100.

Further, when the sliding bearing 100 operates, the first lubricating oil storage 111 is preferably formed to have an inclination angle α in the range of 120 to 160 degrees with the inner peripheral surface $S_1$ of the sliding bearing 100, in order to prevent the first lubricating oil storage 111 from being damaged.

The reason for that is that when the inclination angle α between the first lubricating oil storage 111 and the inner peripheral surface S1 is less than 120 degrees on the inner peripheral surface S1 of the sliding bearing 100, the member mounted inside the sliding bearing 100 to interact with the sliding bearing 100 may be damaged due to an edge of the first lubricating oil storage 111 and when the inclination angle is more than 160 degrees, the inclination angle α becomes excessively large, and as a result, it may be difficult to store the lubricating oil.

Further, when the inclination angle α between the first lubricating oil storage 111 and the inner peripheral surface $S_1$ of the sliding bearing 100 is less than 120 degrees, the inclination angle α becomes too small, and as a result, the lubricating oil stored in the first lubricating oil storage 111 cannot smoothly flow out to the inner peripheral surface $S_1$ of the sliding bearing 100 and when the inclination angle is more than 160 degrees, the inclination angle α becomes too large, and as a result, a large amount of lubricating oil may be supplied to the inner peripheral surface $S_1$ of the sliding bearing 100 at a time.

Figure 6:
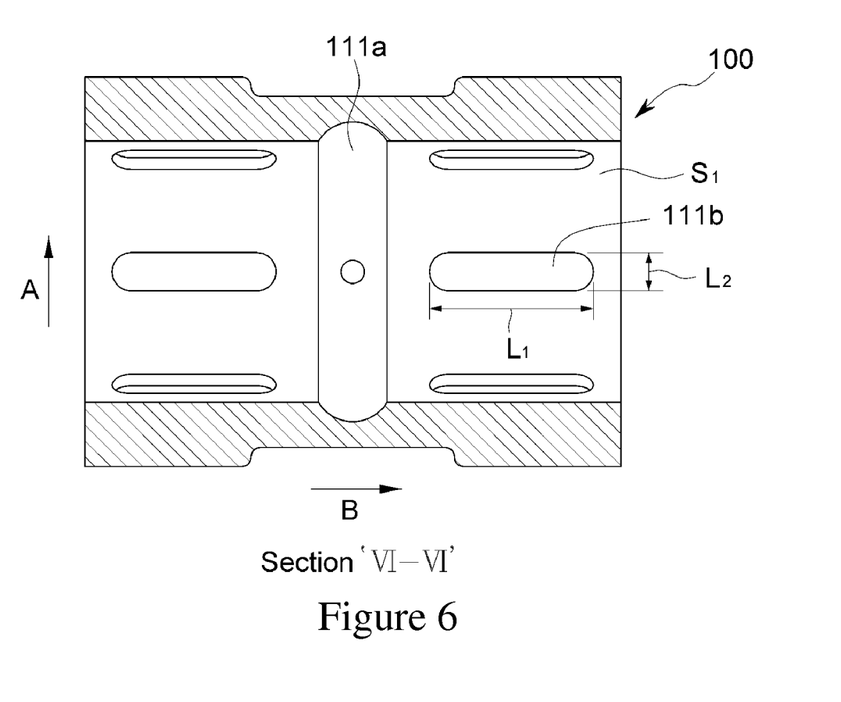
FIGS. 6 and 7 are plan views viewed from a cut surface of a sliding bearing taken along line 14 VII-VII of FIG. 2 according to a first structure of the present invention.
Figure 7:
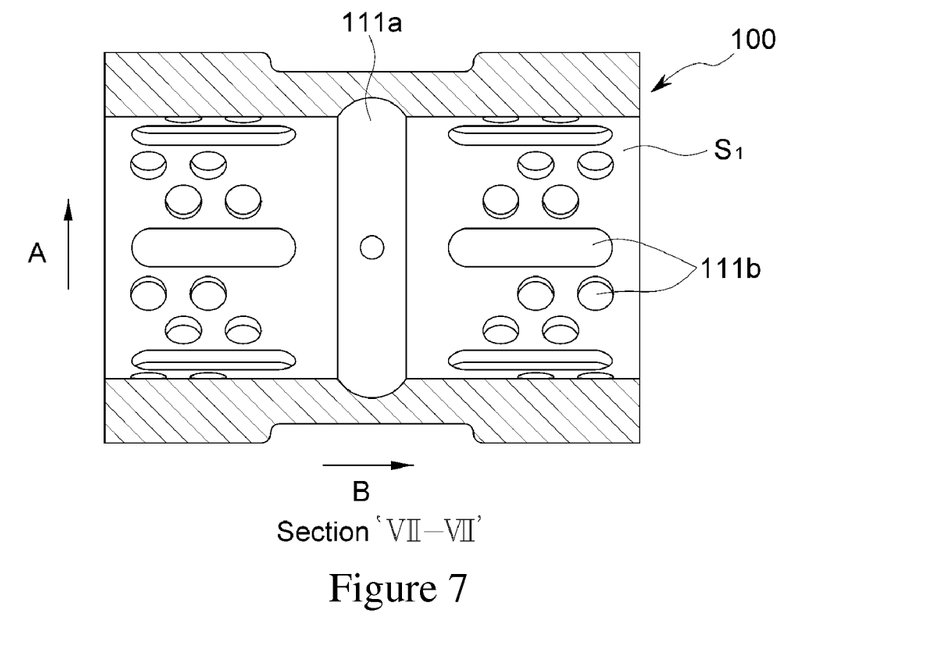

Meanwhile, the shape of the first lubricating oil storage 111 formed on the inner peripheral surface S1 of the sliding bearing 100 is not particularly limited and as shown in FIGS. 2, 6, and 7, the first lubricating oil storage 111 may be formed to have one or more ring grooves 111a formed in a circumferential direction A of the sliding bearing 100 and three or more dent puddle-shaped pocket grooves 111b formed around the ring grooves 111a.

When one or more ring grooves 111a are formed in the circumferential direction A of the sliding bearing 100, the lubricating oil can be smoothly supplied to the inner peripheral surface $S_1$ of the sliding bearing 100, and when the surface area of the first lubricating oil storage 111 in the entire area of the inner peripheral surface $S_1$ occupies 60% to the maximum, three or more pocket grooves 111b are preferably formed in order to improve lubricity by forming the pocket grooves 111b at uniform intervals.

Herein, when the number of the ring grooves 111a is one, the ring groove 111a may be formed anywhere on the inner peripheral surface $S_1$ of the sliding bearing 100. In regards to a formation position of the ring groove 111a, as shown in FIGS. 6 to 7, the ring groove 111a may be formed at the center of the inner peripheral surface S1 and in regards to the shape thereof, as shown in FIG. 2, the ring groove 111a may be formed to have a ring shape by rotating at one time in the circumferential direction A of the sliding bearing 100. Further, the pocket grooves 111b formed around the ring grooves 111a may have all shapes which can be mechanically processed, such as a rectangle, a rectangle with round edges, a circle, an oval, an irregular shape, and the like, and may have shapes formed by combining two or more of various shapes.

In the case of the pocket grooves 111b, a ratio ($L_1/L_2$) of a longitudinal length $L_1$ to a circumferential length $L_2$ thereof may be 1 or more. That is, the length $L_1$ of the pocket groove 111b in a length direction B of the sliding bearing 100 is equal to the length $L_2$ of the pocket groove 111b in the circumferential direction A of the sliding bearing 100 or is more than the length $L_2$ of the pocket groove 111b in the circumferential direction A of the sliding bearing 100, in order to smoothly supply the lubricating oil to the inner peripheral surface $S_1$ of the sliding bearing 100.

Further, in order to smoothly supply the lubricating oil to the inner peripheral surface $S_1$ of the sliding bearing 100, it is preferable that the length $L_1$ of the pocket groove 111b in the length direction B of the sliding bearing 100 is 1/20 to 1/2 of the entire length of the sliding bearing 100 (the entire length in the length direction of the sliding bearing) and the length $L_2$ of the pocket groove 111b in the circumferential direction A of the sliding bearing 100 is 1/100 to 1/20 of a circumferential length of the inner peripheral surface of the sliding bearing 100 (a circumference of an inner diameter of the sliding bearing 100).

When the surface area of the first lubricating oil storage 111 occupies 15% of the entire area of the inner peripheral surface $S_1$, an oil film is not sufficiently formed in the length direction B in spite of forming the pocket grooves 111b uniformly if the length $L_1$ of the pocket groove 111b in the length direction B of the sliding bearing 100 is less than 1/20 of the entire length of the sliding bearing 100, and the oil film may not be sufficiently formed in the circumferential direction A of the sliding bearing 100 because the length $L_2$ of the pocket groove 111b in the circumferential direction A of the sliding bearing 100 decreases if more than 1/2.

Further, in order for the sliding bearing 100 to operate, the oil film should be maintained on the inner peripheral surface S1 thereof, however, when the surface area of the first lubricating oil storage 111 occupies 15% of the entire area of the inner peripheral surface $S_1$, the oil film is not sufficiently formed in the circumferential direction A in spite of forming the pocket grooves 111b uniformly if the length $L_2$ of the pocket groove 111b in the circumferential direction A of the sliding bearing 100 is less than 1/100 of a circumferential length of the inner peripheral surface of the sliding bearing 100 and the oil film cut-off phenomenon may occur among the pocket grooves 111b because the length $L_1$ of the pocket groove 111b in the length direction B of the sliding bearing 100 relatively decreases in the same area ratio if more than 1/20.

Herein, the depth of the pocket groove 111b formed in the first lubricating oil storage 111 is preferably 2/5 or less of the thickness $T_3$ of the sliding bearing 100 described above, and more preferably in the range of 0.5 to 3 mm. The reason for that is that if the depth of the pocket groove 111b is less than 0.5 mm, the pocket groove 111b cannot sufficiently store the lubricating oil, and as a result, the oil film is not efficiently maintained on the inner peripheral surface S1 of the sliding bearing 100 and if more than 3 mm, a processing cost may be excessively increased.

Meanwhile, the second lubricating oil storage 112 is connected with the first lubricating oil storage 111 through a plurality of passages H to supply the lubricating oil to the first lubricating oil storage 111 and the surface area of the second lubricating oil storage 112 on the outer peripheral surface $S_2$ of the sliding bearing 100 may be 15 to 40% of the entire area of the outer peripheral surface $S_2$.

When the surface area of the second lubricating oil storage 112 is less than 15% of the area of the outer peripheral surface $S_2$ of the sliding bearing 100, overall efficiency of the lubricating oil storing unit 110 is low as compared with a cost for forming the second lubricating oil storage 112, and when more than 40%, the surface area of the second lubricating oil storage 112 on the outer peripheral surface $S_2$ is too large, and as a result, the sliding bearing 100 may not be fixed and separated in spite of fixing the sliding bearing 100 with the maximum fastening amount at the time of fixing the sliding bearing to the member (e.g., the boss) receiving the sliding bearing 100.

Figure 8:
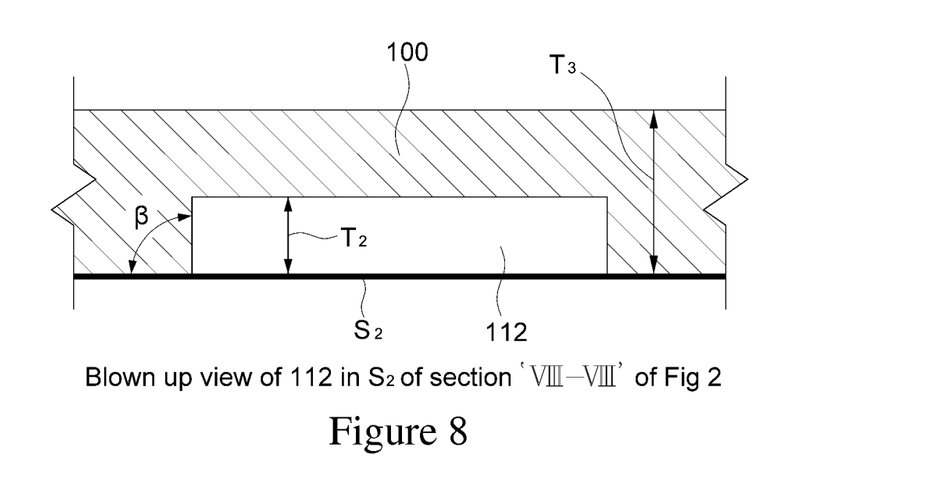
FIGS. 8 to 10 are blown up cross-sectional views of 112 in S2 of sections VIII-VIII, IX-IX, and X-X of FIG. 2 of the present invention.
Figure 9:
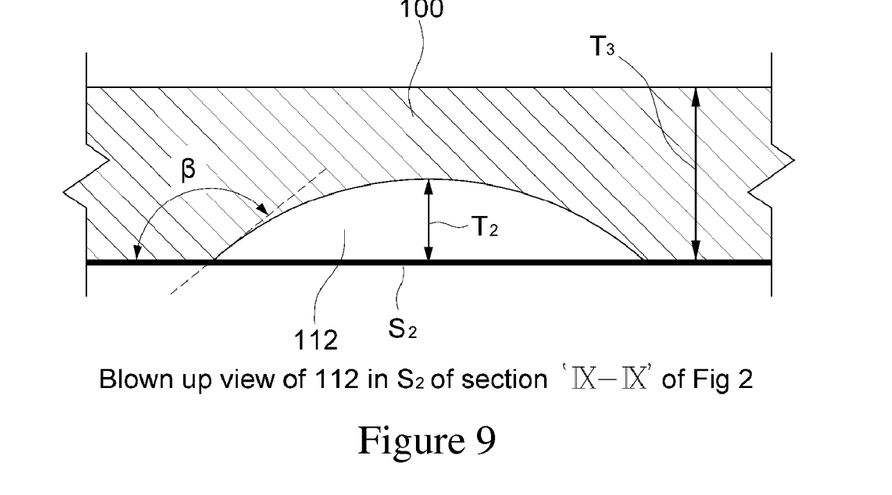
Figure 10:
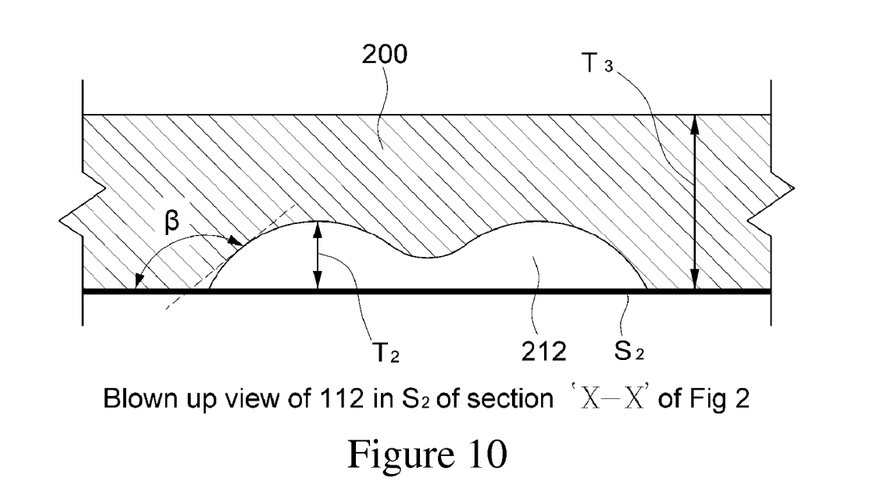

As shown in FIGS. 8 to 10 (FIGS. 8 to 10 show a cross-sectional shape of the second lubricating oil storage 112 which is formed on the outer peripheral surface $S_2$ of the sliding bearing 100), the second lubricating oil storage 112 may be formed to have various cross-sectional shapes. At this time, the depth $T_2$ of the second lubricating oil storage 112 is preferably 2/5 or less of the thickness $T_3$ of the sliding bearing 100 when considering the rigidity, and processing cost and time of the sliding bearing 100.

Further, since the second lubricating oil storage 112 serves to supply the lubricating oil to the first lubricating oil storage 111, the size of an inclination angle β between the outer peripheral surface $S_2$ of the sliding bearing 100 and the second lubricating oil storage 112 is not particularly limited. However, when the sliding bearing 100 is not fixed to but interacts with the member receiving the sliding bearing 100, the second lubricating oil storage 112 may also serve to supply and circulate the lubricating oil to the outer peripheral surface $S_2$ of the sliding bearing 100.

Accordingly, in this case, the second lubricating oil storage 112 may be provided to have the inclination angle β in the range of 120 to 160 degrees with the outer peripheral surface $S_2$ of the sliding bearing 100, in order to prevent the second lubricating oil storage 112 from being damaged. The reason for that is that when the inclination angle β formed with the outer peripheral surface $S_2$ is less than 120 degrees, a member that interacts with the sliding bearing 100 through contacting the sliding bearing may be damaged due to an edge of the second lubricating oil storage 112 and when more than 160 degrees, the inclination angle β formed with the outer peripheral surface $S_2$ becomes excessively large, and as a result, it may be difficult to store the lubricating oil.

Herein, the second lubricating oil storage 112 may be provided at the center of the outer peripheral surface $S_2$ of the sliding bearing 100 in the circumferential direction A of the sliding bearing 100 (specifically, the second lubricating oil storage 112 may have the same shape as the ring groove 111a provided in the first lubricating oil storage 111), as shown in FIG. 2. Further, the second lubricating oil storage 112 is preferably connected with the ring groove 111a of the first lubricating oil storage 111 at the time of connecting the first lubricating oil storage 111 through the plurality of passages H. The reason for that is that the lubricating oil can be uniformly dispersed to the inner peripheral surface $S_1$ of the sliding bearing 100 only when the lubricating oil is supplied to the ring groove 111a provided at the center of the inner peripheral surface $S_1$ of the sliding bearing 100.

[Sliding Bearing of Second Structure]

The sliding bearing according to the second structure of the present invention includes a lubricating oil storing unit storing lubricating oil on the surface thereof and the lubricating oil storing unit may include a first lubricating oil storage provided on an inner peripheral surface of the sliding bearing and a second lubricating oil storage provided on an outer peripheral surface of the sliding bearing.

At this time, it is preferable that the surface area of the first lubricating oil storage on the inner peripheral surface of the sliding bearing is 15 to 60% of the entire area of the inner peripheral surface of the sliding bearing and the surface area of the second lubricating oil storage on the outer peripheral surface of the sliding bearing is 15 to 40% of the entire area of the outer peripheral surface of the sliding bearing.

Since a detailed description of the lubricating oil storing unit formed in the sliding bearing of the second structure is the same as that of the sliding bearing of the first structure, the detailed description thereof will be omitted. Further, since descriptions of the first lubricating oil storage and the second lubricating oil storage included in the lubricating oil storing unit and a detailed description of the surface area thereof are the same as above, the descriptions will be omitted.

[Sliding Bearing Assembly]

Figure 11:
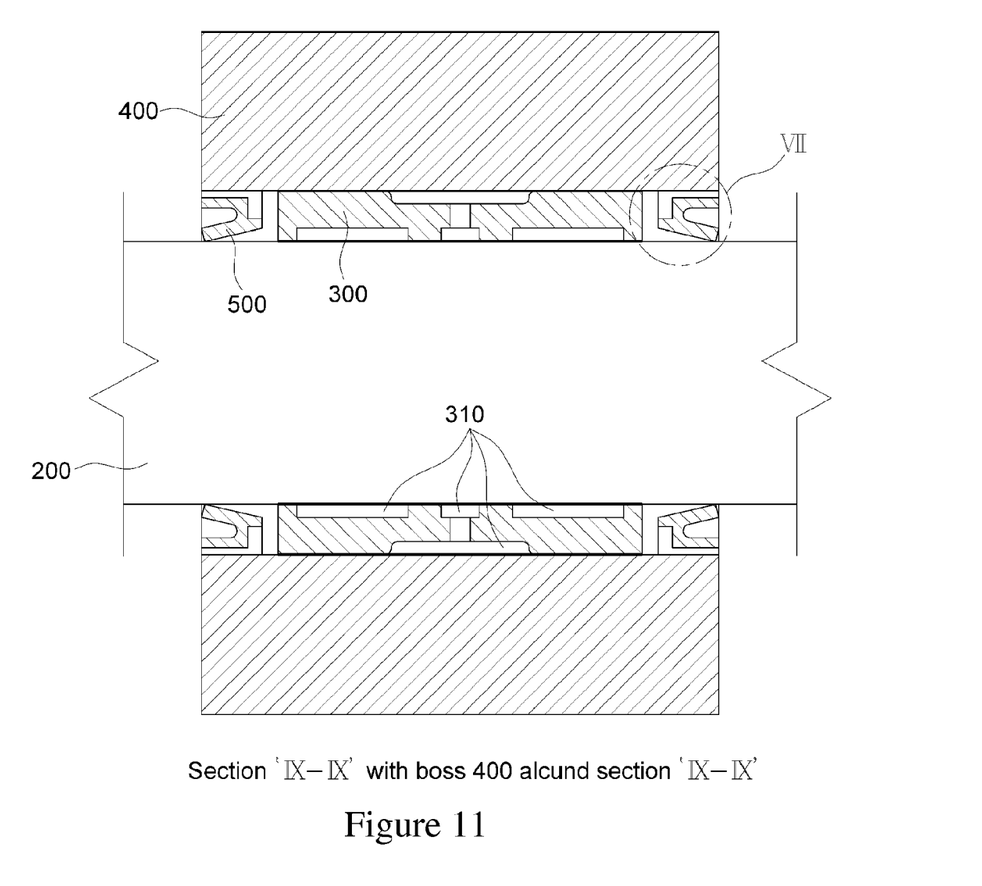
FIG. 11 is a cross-sectional view of section XI-XI of FIG. 11 with the boss 400 around section XI-XI of FIG. 11 according to an exemplary embodiment of the present invention.

FIG. 11 is a cross-sectional view of a sliding bearing assembly according to the present invention.

Referring to FIG. 11, the sliding bearing assembly of the present invention includes a shaft 200, a sliding bearing 300, and a boss 400.

The shaft 200 is inserted into the sliding bearing 300. At this time, the shaft 200 and the sliding bearing 300 are integrated with each other to rotate or shake or move with being separated from each other.

The sliding bearing 300 receives the shaft 200 and serves to guide rotation or shaking of the shaft. At this time, a lubricating oil storing unit 310 is provided on the surface of the sliding bearing 300. That is, the lubricating oil storing unit 310 storing and supplying lubricating oil is provided in the sliding bearing 300 to obtain sufficient lubrication for a long time without generating partial oil film cut-off or oil film shortage between the shaft 200 and the sliding bearing 300.

The sliding bearing 300 of the present invention can specifically adopt the sliding bearing of the first structure or the second structure described above, and since a detailed description of the sliding bearing 300 is the same as above, the detailed description will be omitted.

The boss 400 which receives the sliding bearing 300 is fixed to the sliding bearing 300, but may be rotatably coupled with the sliding bearing 300.

Meanwhile, the sliding bearing assembly of the present invention may further include dust seals 500 provided at both sides of the sliding bearing 300 in order to prevent various impurities (e.g., dust) from penetrating the sliding bearing 300. At this time, each of the dust seals 500 is preferably provided to be separated from both ends of the sliding bearing 300 by a predetermined range of interval $L_3$ (see FIG. 12).

Figure 12:
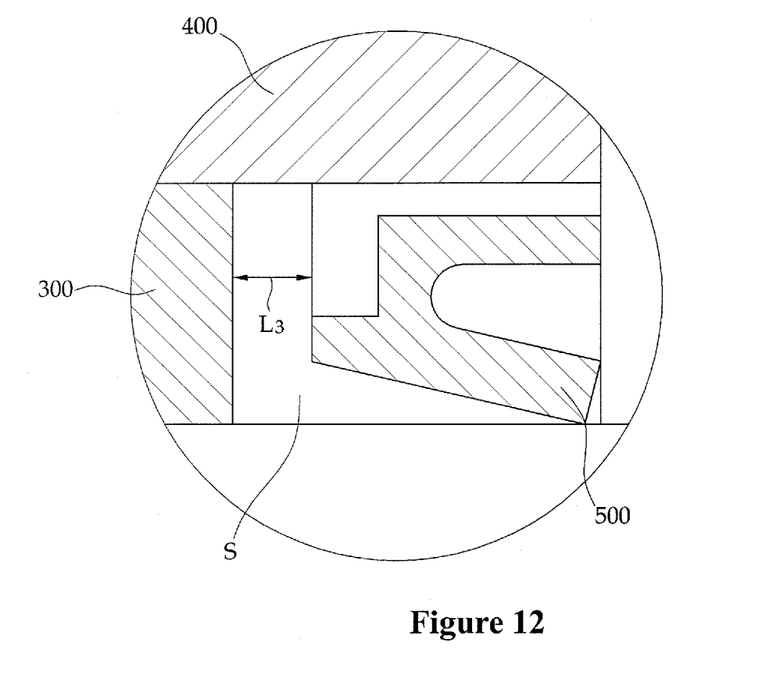
FIG. 12 is an enlarged cross-sectional view enlarging a part of section XII of FIG. 11 of a sliding bearing assembly according to an exemplary embodiment of the present invention.

The reason for that is that when the dust seals 500 are mounted to be maintained at the predetermined range of interval $L_3$ at the time of mounting the dust seals 500 at both ends of the sliding bearing 300, the content of the lubricating oil increases as much as a space S provided by the interval $L_3$, and as a result, an oil film maintaining time can increase. That is, the new space S capable of storing the lubricating oil is provided as the interval L3 provided between both ends of the sliding bearing 300 and the dust seals 500 to further improve lubricity of the sliding bearing 300.

Herein, the respective intervals L3 between both ends of the sliding bearing 300 and the dust seals 500 may vary in some cases, but are preferably in the range of 0 to 15 mm, that is, 15 mm or less. The reason for that is that when the respective intervals L3 between the both ends of the sliding bearing 300 and the dust seals 500 are more than 15 mm, the size of the boss 400 increases to the side and the weight of the sliding bearing assembly increases.

The sliding bearing assembly of the present invention can be applied to all assembly products constituted by the shaft, the sliding bearing, the boss, and the dust seal used in a general market.

Herein, products used as the shaft 200 may adopt products by performing strengthening heat treatment such as carburizing heat treatment, high-frequency heat treatment, quenching treatment, steam heat treatment, nitriding heat treatment, combined heat treatment, and the like with respect to general carbon steel, alloy steel, structural steel, bar steel, and the like and products subjected to lubrication coating such as Cr plating, oxide film, MoS2, and combined plating with respect to the corresponding products may be used, but are not limited thereto.

The sliding bearing 300 may be used by strengthening heat treatment and lubrication coating of products manufactured by pellet, cast steel, cast iron, carbon steel, alloy steel, structural steel, bar steel, a steel sheet, nonferrous alloy, special alloy, and the like, if necessary, but is not limited thereto.

As the boss 400 and the dust seal 500, products suitable for mechanical device structures and use conditions thereof are used.

In the sliding bearing assembly of the present invention described above, since the lubricating oil storing unit 310 capable of storing the lubricating oil is provided maximally in consideration of the volume of the sliding bearing 300, the lubricating oil can be sufficiently supplied when the sliding bearing 300 operates without magnifying the shaft 200 and the sliding bearing 300, and a supplying time of the lubricating oil can also be extended.

Meanwhile, the lubricating oil used in the sliding bearing and the sliding bearing assembly of the present invention described above is not particularly limited and may adopt solid lubricants such as graphite, MoS2, WS2, wax, polymer, resin, and the like that can create the same effect as the lubricating oil.

Hereinafter, the present invention will be described in more detail through examples and comparative examples.

First to Seventh Examples and First to Fifth Comparative Examples

Like the numerical figures described in Table 1 below, sliding bearings according to first to seventh examples and first to fifth comparative examples were provided and subjected to carburizing heat treatment and the sizes thereof were set to 70×85×60 mm. Herein, arrangement of the first lubricating oil storage was based on FIG. 6, the cross-sectional shape thereof was implemented based on FIG. 5, and the inclination angle α formed with the inner peripheral surface of the sliding bearing was implemented as 125 degrees for a smooth experiment (at this time, the number of the ring grooves formed in the circumferential direction is one and the depth of a cross section of the ring groove was 2 mm and the width thereof was 7 mm). Further, the cross-sectional shape of the second lubricating storage was implemented based on FIG. 8, the inclination angle β formed with the outer peripheral surface of the sliding bearing was implemented as 150 degrees (at this time, the depth of the second lubricating oil storage was set to 2 mm), and the intervals between the dust seals and the both ends of the sliding bearing were implemented as 0 mm and 10 mm, respectively, as shown in Table 1.

TABLE 1

| Classification | First lubricating oil storage | | | | | | Second lubricating oil storage | | | | |
|---|---|---|---|---|---|---|---|---|---|---|---|
| | Pocket groove | | | Ring groove | | | Area ratio[1] (%) | Area ratio[2] (%) | Volume (mm³) | L[3] (mm) | Volume ratio[4] (%) |
| | Number | Area (mm²) | Volume (mm³) | Number | Area (mm²) | Volume (mm³) | | | | | |
| First example | 3 | 600 | 900 | 1 | 1538.6 | 1560.6 | 16.2 | 20 | 3947.0 | 0 | 5.9 |
| Second example | 6 | 1200 | 1800 | 1 | 1538.6 | 1560.6 | 20.8 | 20 | 3947.0 | 0 | 6.7 |
| Third example | 12 | 2400 | 3600 | 1 | 1538.6 | 1560.6 | 29.9 | 20 | 3947.0 | 0 | 8.3 |
| Fourth example | 18 | 3600 | 5400 | 1 | 1538.6 | 1560.6 | 39.0 | 20 | 3947.0 | 0 | 10.0 |
| Fifth example | 18 | 3600 | 5400 | 1 | 1538.6 | 1560.6 | 39.0 | 40 | 7894.0 | 0 | 13.6 |
| Sixth example | 24 | 4800 | 7200 | 1 | 1538.6 | 1560.6 | 48.1 | 20 | 3947.0 | 0 | 11.6 |
| Seventh example | 6 | 1200 | 1800 | 1 | 1538.6 | 1560.6 | 20.8 | 20 | 3947.0 | 10 | 6.7 |
| First comparative example | 6 | 600 | 1800 | 1 | 1538.6 | 1560.6 | 16.2 | 8 | 1644.6 | 0 | 4.6 |
| Second comparative example | 6 | 600 | 1800 | 1 | 1538.6 | 1560.6 | 16.2 | — | — | 0 | 3.1 |
| Third comparative example | 0 | — | — | 1 | 1538.6 | 1560.6 | 11.7 | — | — | 0 | 1.4 |
| Fourth comparative example | 2 | 400 | 600 | 1 | 1538.6 | 1560.6 | 14.7 | — | — | 0 | 2.0 |
| Fifth comparative example | 32 | 6400 | 9600 | 1 | 1538.6 | 1560.6 | 60.2 | 20 | 3947.0 | 0 | 13.8 |

*Entire volume of siding bearing: 109,508 (mm³)
**Entire area of inner peripheral surface of sliding bearing: 13,188 (mm²)
[1]Area ratio: Ratio of surface area of first lubricating oil storage to entire area of inner peripheral surface of sliding bearing
[2]Area ratio: Ratio of surface area of second lubricating oil storage to entire area of outer peripheral surface of sliding bearing
[3]L: Interval between sliding bearing and dust seal
[4]Volume ratio: ratios of first lubricating oil storage and second lubricating oil storage in entire volume of sliding bearing First Experimental Example Seizure Load A shaft having a diameter of approximately 70 mm was mounted and assembled to each of the sliding bearings manufactured in the first to seventh examples and the first to fifth comparative examples and thereafter, grease which is the lubricating oil is supplied to the inner peripheral surface of the sliding bearing at one time and a continuous operation was performed under the conditions of a shaking angle of 90 degrees and a shaking speed of 2 cm/sec. A predetermined load is applied to each of the sliding bearings from the outside every 1,000 times during the continuous operation and thus a load when seizure occurred was estimated as the seizure load and the result thereof was shown in Table 2.

TABLE 2

| Classification | First lubricating oil storage | | Second lubricating oil storage Area ratio[2](%) | L[3] (mm) | Volume ratio[4](%) | Seizure load |
|---|---|---|---|---|---|---|
| | Pocket number | Area ratio[1](%) | | | | |
| First example | 3 | 16.2 | 20 | 0 | 5.9 | 22 ton |
| Second example | 6 | 20.8 | 20 | 0 | 6.7 | 26 ton |
| Third example | 12 | 29.9 | 20 | 0 | 8.3 | 34 ton |
| Fourth example | 18 | 39.0 | 20 | 0 | 10.0 | 40 ton |
| Fifth example | 18 | 39.0 | 40 | 0 | 13.6 | 42 ton |
| Sixth example | 24 | 48.1 | 20 | 0 | 11.6 | 36 ton |
| Seventh example | 6 | 20.8 | 20 | 10 | 6.7 | 28 ton |

TABLE 2-continued

| Classification | First lubricating oil storage Pocket number | First lubricating oil storage Area ratio[1](%) | Second lubricating oil storage Area ratio[2](%) | L[3] (mm) | Volume ratio[4](%) | Seizure load |
|---|---|---|---|---|---|---|
| First comparative example | 6 | 20.8 | 8 | 0 | 4.6 | 22 ton |
| Second comparative example | 6 | 20.8 | — | 0 | 3.1 | 20 ton |
| Third comparative example | 0 | 11.7 | — | 0 | 1.4 | 10 ton |
| Fourth comparative example | 2 | 14.7 | — | 0 | 2.0 | 12 ton |
| Fifth comparative example | 32 | 60.2 | 20 | 0 | 13.8 | 15 ton |

When the sliding bearing has the same size as the sliding bearings manufactured in the first to seventh examples and the first to fifth comparative examples, the seizure load as a joint portion of an excavator needs 20 tons or more during the continuous operation.

Herein, in the sliding bearings manufactured in the first to seventh examples, since a surface area ratio of the first lubricating oil storage and volume ratios of the first lubricating oil storage and the second lubricating oil storage in the entire volume of the sliding bearing were designed within the ranges presented in the present invention, it could be found that the seizure load increased. However, in the third to fifth comparative examples, as the surface area ratio of the first lubricating oil storage deviated from the range presented in the present invention, it could be found that the seizure load was very low.

Meanwhile, factors that have the largest influence on the seizure load are the number of the pocket grooves formed in the first lubricating oil storage and the surface area ratio of the first lubricating oil storage and it could be found that it is a little effective as the volume ratios of the first lubricating oil storage and the second lubricating oil storage in the entire volume of the sliding bearing increases.

Further, the first to fourth comparative examples in which the volume ratios of the first lubricating oil storage and the second lubricating oil storage in the entire volume of the sliding bearing are less than 5 volume % in the range presented by the present invention, were presented above, but when the case in which the volume ratio is more than 30 volume % which is the range presented by the present invention is manufactured and compared with the examples of the present invention, a lubricating oil storing space becomes too large, and as a result, it will be apparently found that the rigidity of the sliding bearing deteriorates and the seizure load decreases.

Second Experimental Example

Supplying Cycle

While a high load and a low load were repeated similarly as an operation condition of an actual excavator in order to test a supplying hour by using the sliding bearings manufactured in the first to seventh examples and the first to fifth comparative examples, grease which is the lubricating oil was supplied to the inner peripheral surface of the sliding bearing at one time and a continuous operation was performed under the conditions of a shaking angle of 90 degrees and a shaking speed of 2 cm/sec. It was tested in which hours an oil film cut-off phenomenon occurs after the grease was supplied at one time and the result thereof was shown in Table 3.

TABLE 3

| Classification | First lubricating oil storage Pocket number | First lubricating oil storage Area ratio[1](%) | Second lubricating oil storage Area ratio[2](%) | L[3] (mm) | Volume ratio[4](%) | Supplying time |
|---|---|---|---|---|---|---|
| First example | 3 | 16.2 | 20 | 0 | 5.9 | 150 hours |
| Second example | 6 | 20.8 | 20 | 0 | 6.7 | 180 hours |
| Third example | 12 | 29.9 | 20 | 0 | 8.3 | 250 hours |
| Fourth example | 18 | 39.0 | 20 | 0 | 10.0 | 500 hours |
| Fifth example | 18 | 39.0 | 40 | 0 | 13.6 | 600 hours |
| Sixth example | 24 | 48.1 | 20 | 0 | 11.6 | 550 hours |
| Seventh example | 6 | 20.8 | 20 | 10 | 6.7 | 240 hours |

TABLE 3-continued

| Classification | First lubricating oil storage Pocket number | First lubricating oil storage Area ratio[1](%) | Second lubricating oil storage Area ratio[2](%) | L[3] (mm) | Volume ratio[4](%) | Supplying time |
|---|---|---|---|---|---|---|
| First comparative example | 6 | 20.8 | 8 | 0 | 4.6 | 100 hours |
| Second comparative example | 6 | 20.8 | — | 0 | 3.1 | 80 hours |
| Third comparative example | 0 | 11.7 | — | 0 | 1.4 | 50 hours |
| Fourth comparative example | 2 | 14.7 | — | 0 | 2.0 | 60 hours |
| Fifth comparative example | 32 | 60.2 | 20 | 0 | 13.8 | 200 hours |

At present, in the case of the excavator, when a daily operation time is set to 20 hours, a supplying hour of 140 hours or more is required so that the grease is supplied every week.

Herein, in the case of the sliding bearings of the first to seventh examples, since the volume ratios of the first lubricating oil storage and the second lubricating oil storage in the entire volume of the sliding bearing are within the range of 5 to 30 volume % presented in the present invention, it could be verified that the supplying time is extended, and in particular, it could be found that as the volume ratios of the first lubricating oil storage and the second lubricating oil storage in the sliding bearing increases, the supplying time significantly increases.

However, as shown in the fifth comparative example, when only the surface area ratio of the first lubricating oil storage increases excessively at the time of increasing the volume ratio, it could be found that the supplying time also decreases as shown in Table 3 while the seizure load decreases as shown in Table 2. Further, in the case of the first to fourth comparative examples, it could be found that the supplying time is very short as the volume ratios of the first lubricating oil storage and the second lubricating oil storage in the entire volume of the sliding bearing deviate from the range presented in the present invention.

INDUSTRIAL APPLICABILITY

In a sliding bearing according to the present invention, since a lubricating oil storing unit capable of maximally storing lubricating oil is provided on the surface of the sliding bearing in consideration of the entire volume of the sliding bearing, it is possible to obtain sufficient lubrication in spite of contacting a member (e.g., a shaft) that interacts with the sliding bearing for a long time.

Further, since it is possible to obtain sufficient lubrication in spite of the long-time contact, abrasion resistance and seizure resistance of the sliding bearing can be improved and a supplying time (supplying cycle) to supply the lubricating oil to the sliding bearing can also be extended.

In addition, since it is possible to store a sufficient amount of lubricating oil in the lubricating oil storing unit formed on the surface of the sliding bearing without magnifying the sliding bearing, manufacturing efficiency of a sliding bearing assembly including the sliding bearing can be improved.

The invention claimed is:

1. A sliding bearing having a lubricating oil storing unit for storing lubricating oil on a surface thereof,
    the lubricating oil storing unit includes a first lubricating oil storage provided on an inner peripheral surface of the sliding bearing and a second lubricating oil storage provided on an outer peripheral surface of the sliding bearing,
    wherein the first lubricating oil storage unit comprises at least one ring groove formed in a circumferential direction of the sliding bearing and at least three pocket grooves each having a dent puddle shape,
    wherein the volume of the lubricating oil storing unit occupies 8.3 to 11.6 volume % of the entire volume of the sliding bearing,
    wherein a surface area of the first lubricating oil storage on the inner peripheral surface of the sliding bearing is 20.8 to 48.1% of the entire area of the inner peripheral surface of the sliding bearing,
    wherein a surface area of the second lubricating oil storage unit on the outer peripheral surface of the sliding bearing to the entire area of the outer peripheral surface of the sliding bearing is 15 to 40%,
    wherein an inclination angle between the first lubricating oil storage and the inner peripheral surface of the sliding bearing is in the range of 120 to 160 degrees,
    wherein a ratio of the length of a pocket groove in a longitudinal direction of the sliding bearing to the length of the pocket groove in a circumferential direction of the sliding bearing is at least 1,
    wherein a ratio of the length of the pocket groove in the longitudinal direction of the sliding bearing to an entire length of the sliding bearing is 1/20 to 1/2,
    wherein the ratio of length of the pocket groove in the circumferential direction of the sliding bearing to a circumferential length of the inner peripheral surface of the sliding bearing is 1/100 to 1/20,
    wherein the depth of the first lubricating oil storage unit is 2/5 or less of the thickness of the sliding bearing,
    wherein the depth of the second lubricating oil storage unit is 2/5 or less of the thickness of the sliding bearing.
2. The sliding bearing according to claim 1, wherein the lubricating oil storing unit includes at least one passage connecting the first lubricating oil storage and the second lubricating oil storage.

3. The sliding bearing according to claim 1, wherein the depth of each of the at least three pocket grooves is in the range of 0.5 to 3 mm.

4. A sliding bearing assembly, comprising:
   a shaft;
   a sliding bearing of claim 1 that rotates or shakes by receiving the shaft;
   and a boss receiving the sliding bearing.

5. The sliding bearing assembly according to claim 4, further comprising;
   a dust seal provided at both sides of the sliding bearing,
   wherein the dust seals are provided to be separated from both ends of the sliding bearing by intervals in the range of 0 to 15 mm.

\* \* \* \* \*